United States Patent
Shi

(10) Patent No.: US 12,141,165 B2
(45) Date of Patent: Nov. 12, 2024

(54) SMART CONTRACT-BASED DATA PROCESSING METHOD, APPARATUS, DEVICE, AND STORAGE MEDIUM

(71) Applicant: Tencent Technology (Shenzhen) Company Limited, Guangdong (CN)

(72) Inventor: Yifang Shi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 178 days.

(21) Appl. No.: 17/948,832

(22) Filed: Sep. 20, 2022

(65) Prior Publication Data

US 2023/0011298 A1   Jan. 12, 2023

Related U.S. Application Data

(63) Continuation of application No. PCT/CN2021/129945, filed on Nov. 11, 2021.

(30) Foreign Application Priority Data

Dec. 7, 2020 (CN) .......................... 202011414124.6

(51) Int. Cl.
*G06F 16/27* (2019.01)
*G06F 9/48* (2006.01)
(Continued)

(52) U.S. Cl.
CPC .......... *G06F 16/273* (2019.01); *G06F 9/4881* (2013.01); *G06F 16/2379* (2019.01); *G06F 16/24562* (2019.01)

(58) Field of Classification Search
CPC .............. G06F 16/273; G06F 16/24562; G06F 16/2379
See application file for complete search history.

(56) References Cited

U.S. PATENT DOCUMENTS 10,861,015 B1   12/2020   Alt et al.
2003/0212660 A1*  11/2003   Kerwin ................. G06F 16/252
(Continued)

FOREIGN PATENT DOCUMENTS

CN   101782992 A   7/2010
CN   108876360 A   11/2018
(Continued)

OTHER PUBLICATIONS

International Search Report for priority application No. PCT/CN2021/129945 dated Jan. 30, 2022, 4p, in English and Chinese languages.
(Continued)

*Primary Examiner* — Baoquoc N To
(74) *Attorney, Agent, or Firm* — Crowell & Moring LLP

(57) ABSTRACT

A data processing method, apparatus, and device based on a smart contract, and a storage medium can improve execution speed of a smart contract and reduce a running time. A contract call request used for executing a transaction service is acquired. An asynchronous variable statement corresponding to the asynchronous variable function name in a smart contract is also acquired. A first memory and a second memory associated with the first variable parameter are queried based on the first asynchronous variable statement. A data read request is transmitted to the first memory and a separate data read request is transmitted to the second memory in an asynchronous request manner indicated by the first asynchronous variable statement to obtain first to-be-read data and second to-be-read data used for executing the transaction service.

20 Claims, 8 Drawing Sheets

(51) Int. Cl.
    *G06F 16/23*       (2019.01)
    *G06F 16/2455*   (2019.01)

(56) References Cited

U.S. PATENT DOCUMENTS

2014/0007250 A1*   1/2014   Stefanov ............... G06F 21/60
                                                                                 726/26
2017/0364699 A1    12/2017   Goldfarb et al.

FOREIGN PATENT DOCUMENTS

| CN | 109710694 A | 5/2019 |
| CN | 109840429 A | 6/2019 |
| CN | 110706108 A | 1/2020 |
| CN | 110941647 A | 3/2020 |
| CN | 111008201 A | 4/2020 |
| CN | 111026511 A | 4/2020 |
| CN | 112199186 A | 1/2021 |

OTHER PUBLICATIONS

International Search Report and Written Opinion for priority application No. PCT/CN2021/129945 mailed Jan. 30, 2022, in Chinese language, with English language translation of International Search Report, 10p.
Office Action for Chinese patent application No. 202011414124.6 dated Jan. 20, 2021, 7p, in Chinese language.
Concise Explanation of Relevance for B8.

\* cited by examiner

SMART CONTRACT-BASED DATA PROCESSING METHOD, APPARATUS, DEVICE, AND STORAGE MEDIUM

RELATED APPLICATION

This application claims priority as a continuation to PCT/CN2021/129945, filed on Nov. 11, 2021, published as WO2022121613A1, titled "SMART CONTRACT-BASED DATA PROCESSING METHOD AND APPARATUS, DEVICE, AND STORAGE MEDIUM," which claims priority to Chinese Patent Application No. 202011414124.6, filed on Dec. 7, 2020, titled "DATA PROCESSING METHOD, APPARATUS, AND DEVICE BASED ON SMART CONTRACT, AND STORAGE MEDIUM, each of which are incorporated herein by reference in their entirety.

FIELD OF THE TECHNOLOGY

This application relates to the field of computer technologies, and in particular, to a data processing method, apparatus, and device based on a smart contract, and a readable storage medium.

BACKGROUND OF THE DISCLOSURE

A blockchain is an application of a computer technology such as distributed data storage, point-to-point transmission, a consensus mechanism, or an encryption algorithm. It is mainly used for sorting data in chronological order and encrypting the data into a ledger so that the data cannot be tampered with or forged, and so that the data can be verified, stored, and updated. The blockchain can also be used for encrypted data transmission, node identification, and secure access, and is an advanced distributed infrastructure. Many applications of the blockchain utilize the blockchain's tamper resistance and authenticity.

In a blockchain system, a smart contract is code that can be understood and executed by each node on a blockchain, and may execute any logic and obtain a result. The smart contract may be an executable program, and the blockchain may be an operating system that provides a program running environment. That is, an execution process of the smart contract may be an execution process of a computer program.

During distributed storage, when data is read or stored using a smart contract, reading or storing must be performed sequentially each time. Only after one step is performed can a next step can be performed, which takes a relatively long time, and an execution speed of the smart contract is relatively slow.

SUMMARY

Embodiments of this application provide a data processing method, apparatus, and device based on a smart contract, and a readable storage medium, which can improve execution speed of a smart contract and reduce a running time.

Some embodiments of this application provide a data processing method based on a smart contract, including:

acquiring a contract call request used for executing a transaction service; the contract call request including a first asynchronous variable function name and a first variable parameter;

acquiring a first asynchronous variable statement corresponding to the first asynchronous variable function name in a smart contract, and querying, according to the first asynchronous variable statement, a first memory and a second memory that are associated with the first variable parameter; the first memory being a location at which first to-be-read data is located, and the second memory being a location at which second to-be-read data is located; and separately transmitting a data read request to the first memory and the second memory in an asynchronous request manner indicated by the first asynchronous variable statement, to obtain the first to-be-read data and the second to-be-read data that are used for executing the transaction service; a transmitting time stamp used for transmitting the data read request to the second memory being earlier than a return time stamp for the first memory to return the first to-be-read data.

Some embodiments of this application provide a data processing apparatus based on a smart contract, including:

a request acquiring module, configured to acquire a contract call request used for executing a transaction service; the contract call request including a first asynchronous variable function name and a first variable parameter;

a querying module, configured to: acquire a first asynchronous variable statement corresponding to the first asynchronous variable function name in a smart contract, and query, according to the first asynchronous variable statement, a first memory and a second memory that are associated with the first variable parameter; the first memory being a location at which first to-be-read data is located, and the second memory being a location at which second to-be-read data is located; and a data acquiring module, configured to separately transmit a data read request to the first memory and the second memory in an asynchronous request manner indicated by the first asynchronous variable statement, to obtain the first to-be-read data and the second to-be-read data that are used for executing the transaction service; a transmitting time stamp used for transmitting the data read request to the second memory being earlier than a return time stamp for the first memory to return the first to-be-read data.

Some embodiments of this application provide a computer device, including: a processor and a memory, the memory storing a computer program, and the computer program, when executed by the processor, causing the processor to perform the method according to the embodiments of this application.

Some embodiments of this application provide a computer-readable storage medium, storing a computer program, the computer program including program instructions, the program instructions, when executed by a processor, implementing the method according to the embodiments of this application.

Some embodiments of this application provide a computer program product or a computer program, including computer instructions, and the computer instructions being stored in a computer-readable storage medium. A processor of a computer device reads the computer instructions from the computer-readable storage medium, and the processor executes the computer instructions, to cause the computer device to perform the method according to the embodiments of this application.

DESCRIPTION OF EMBODIMENTS

The technical solutions in embodiments of this application are described in further detail in the following with reference to the accompanying drawings. The following descriptions show and describe merely some embodiments of this application, and a person of ordinary skill in the art may understand additional embodiments according to these accompanying drawings as within the scope of this disclosure.

Figure 1:
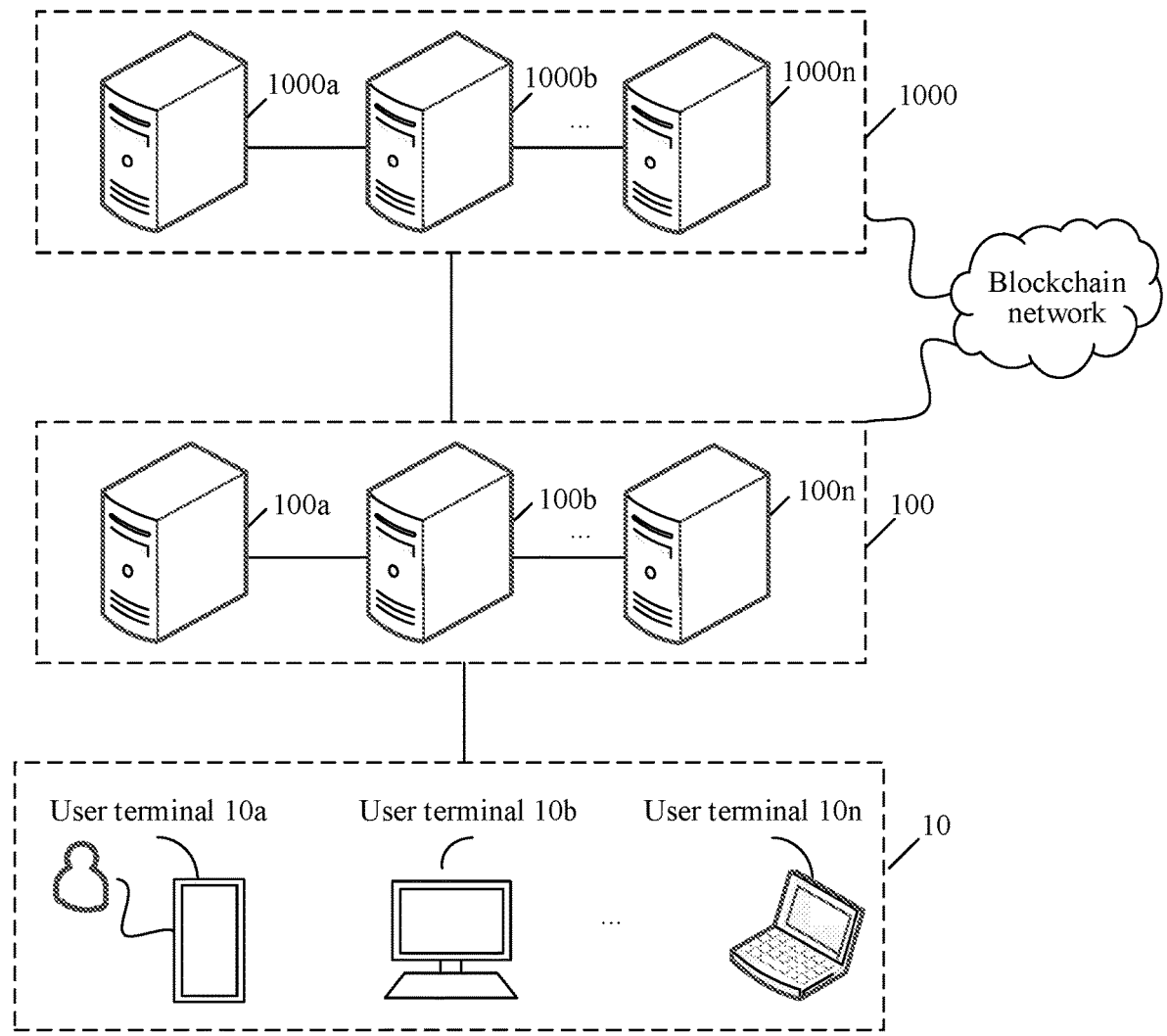
FIG. 1 is a network architecture diagram according to some embodiments of this application.

FIG. 1 is a schematic diagram of a network architecture according to some embodiments of this application. A blockchain is an application of a computer technology such as distributed data storage, point-to-point transmission, a consensus mechanism, or an encryption algorithm. It is mainly used for sorting data in chronological order and encrypting the data into a ledger so that the data cannot be tampered with or forged, and so that the data can be verified, stored, and updated.

The blockchain is essentially a decentralized database, and each node in the database stores the same blockchain. The blockchain network divides nodes into a core node, a data node (or a light node), where the core node is responsible for consensus of the blockchain in the whole network, that is, the core node is a consensus node in the blockchain network.

A process in which transaction data in the blockchain network is written into a ledger may be as follows: A client transmits transaction data to a data node (or a light node), and then the transaction data is transferred between data nodes (or light nodes) in the blockchain network in a successive manner until a consensus node receives the transaction data, and then the consensus node packages the transaction data into a block, and performs consensus with another consensus node. After consensus is passed, the block that carries the transaction data is written into the ledger.

A blockchain system may include a smart contract. The smart contract in the blockchain system may be code that can be understood and executed by each node (including a consensus node) of a blockchain, and can execute any logic to obtain a result. A user may initiate a transaction service request by using a client, and call a smart contract deployed on a blockchain. Subsequently, a data node (or a light node) on the blockchain may transmit the transaction service request to a consensus node, and each consensus node on the blockchain may separately run the smart contract.

The blockchain may include one or more smart contracts. These smart contracts may be distinguished by using identity documents (ID) or names, and the transaction service request initiated by the client may also carry the identity documents or the names of the smart contracts, so as to specify a smart contract to run in the blockchain. If the smart contract specified by the client is a contract from which data is to be read, each consensus node accesses a local ledger to read the data. Finally, each consensus node verifies whether execution results are consistent (that is, consensus is performed). If they are consistent, the execution results may be stored in respective local ledgers, and the execution results may be returned to the client.

As shown in FIG. 1, the network architecture may include a core node (consensus node) cluster 1000, a data node cluster (or a light node cluster) 100, and a user terminal (client) cluster 10. The core node cluster 1000 may include at least two core nodes, and the data node cluster 100 may include at least two data nodes. As shown in FIG. 1, the core node cluster 1000 may include a core node cluster 1000a, a core node cluster 1000b, . . . , and a core node cluster 1000n. The data node cluster 100 may include a data node cluster 100a, a data node cluster 100b, . . . , and a data node cluster 100n. The user terminal cluster 10 may include a user terminal 10a, a user terminal 10b, . . . , and a user terminal 10n.

As shown in FIG. 1, the user terminal 10a, the user terminal 10b, . . . , and the user terminal 10n may be separately connected to the data node cluster 100a, the data node cluster 100b, . . . , and the data node cluster 100n to perform a network connection, so that the user terminal can exchange data with the data node by using the network connection. The data node cluster 100a, the data node cluster 100b, . . . , and the data node cluster 100n may be separately connected to the core node cluster 1000a, the core node cluster 1000b, . . . , and the core node cluster 1000n to perform a network connection, so that the data node can exchange data with the core node by using the network connection. The data node cluster 100a, the data node cluster 100b, . . . , and the data nodes 100n are connected to each other, so that data interaction can be performed between the data nodes. The core node cluster 1000a, the core node cluster 1000b, . . . and the core node cluster 1000n are connected to each other, so that data interaction can be performed between the core nodes.

The user terminal 10a, the data node cluster 100a, and the core node cluster 1000a are used as examples. The data node cluster 100a may receive a transaction service request transmitted by the user terminal 10a (the transaction service request carries an ID or a name of a smart contract). Subsequently, the data node cluster 100a may transmit the transaction service request to the core node cluster 1000a by using the data node cluster 100. The core node cluster 1000a may run the smart contract, execute the transaction service by using the smart contract, obtain an execution result, store the execution result in a memory pool (such as a transaction pool), and generate a new block according to the execution result. Subsequently, the core node cluster 1000a may separately transmit the newly generated block to another core node in a blockchain network in which the core node cluster 1000a is located according to a node identifier of the another core node (that is, a consensus node) in the blockchain network. The another core node performs verification (that is, performs consensus) on the newly generated block, and adds the previously generated block to a blockchain stored in the core node (that is, stores an execution result in the blockchain after consensus is passed).

Each core node in the blockchain network has a node identifier corresponding to the core node, and each core node in the blockchain network may store a node identifier of another core node in the blockchain network, so that a generated block is subsequently broadcast to the another core node in the blockchain network according to the node identifier of the another core node, so that data stored on all core nodes in the blockchain network is consistent.

For a process in which a user terminal transmits a transaction service request to a blockchain and runs a smart contract by using a core node to obtain an execution result, in this embodiment of this application, a program statement that can support asynchronous and parallel running of the smart contract is added to the smart contract.

A user terminal may create or modify code of a specified smart contract in a blockchain system by initiating a contract deployment request (for example, a contract creation request or a contract modification request), that is, the contract deployment request transmitted by the user terminal may carry an ID or a name of the smart contract to specify the smart contract, or may carry a related program statement such as an asynchronous variable function name and an asynchronous variable statement that are used for creating or modifying the smart contract. After a core node completes deployment of the specified smart contract according to the contract deployment request, the core node may return a deployment completion result to the user terminal. Subsequently, a user may initiate a contract call request to the core node by using the user terminal, so that the user can call the smart contract that has been deployed with the related program statement such as the asynchronous variable function name and the asynchronous variable statement, and the smart contract can be executed asynchronously and in parallel according to the related program statement. Therefore, the smart contract can be executed at a higher speed.

Asynchronous parallel running may mean that after contract code of a smart contract is called, a next call can be continued without waiting for a result. The method provided in this embodiment of this application is to support asynchronous parallel running of a smart contract by using an asynchronous variable function name and an asynchronous variable statement in the smart contract, so as to increase an execution speed of the smart contract.

An example method is as follows: The core node cluster 1000a, the data node cluster 100a, and the user terminal 10a are used as examples. The user terminal 10a may transmit, to the core node cluster 1000a by using the data node cluster 100a, a contract call request (transaction service request) used for executing a transaction service. The contract call request may include information such as an asynchronous variable function name, a variable parameter, and an ID of a smart contract. According to the ID of the smart contract, the corresponding smart contract may be called, and a program statement deployed in the smart contract may be called according to the asynchronous variable function name and the variable parameter. That is, the core node cluster 1000a may call the program statement (for example, an asynchronous variable statement) corresponding to the asynchronous variable function name to execute the transaction service in an asynchronous parallel execution manner, obtain an execution result, and after consensus is passed, chain the execution result.

Figure 3:
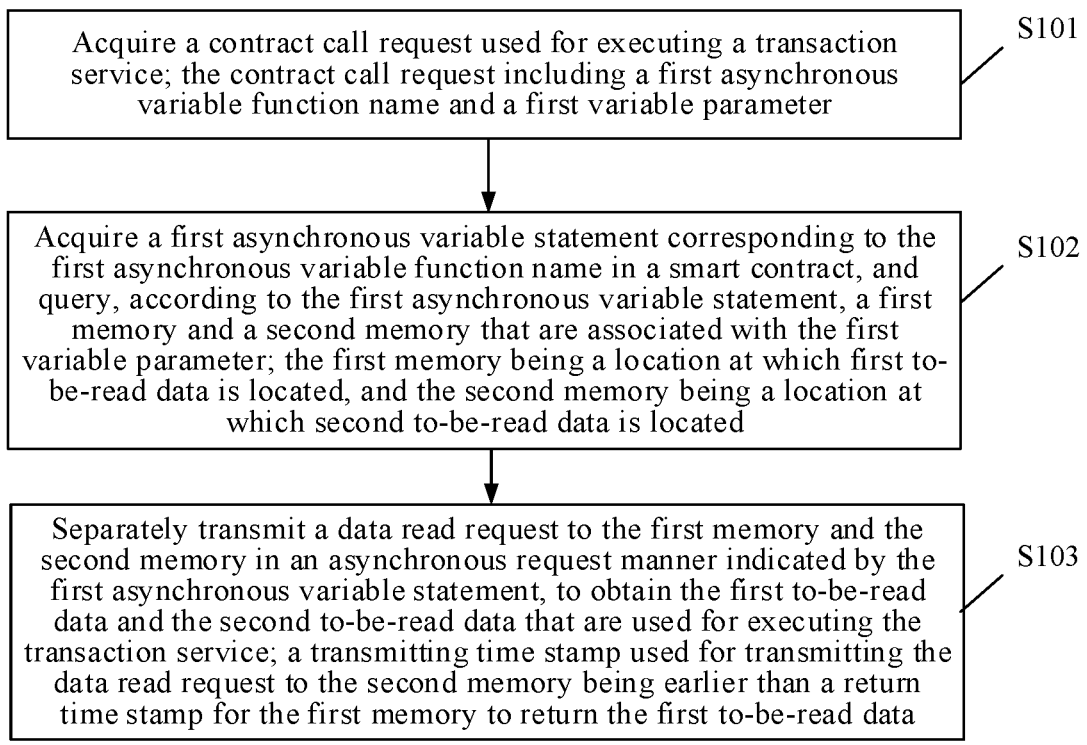
FIG. 3 is a schematic flowchart of a data processing method based on a smart contract according to some embodiments of this application.

For an example implementation in which the smart contract is deployed and the core node calls the asynchronous variable function name and the asynchronous variable statement to perform asynchronous parallel execution, reference may be made to the description in the subsequent embodiment corresponding to FIG. 3.

The methods provided of this disclosure may be performed by a computer device. The computer device may be, but is not limited to, a terminal or a server. The node may be a computer device.

Figure 2:
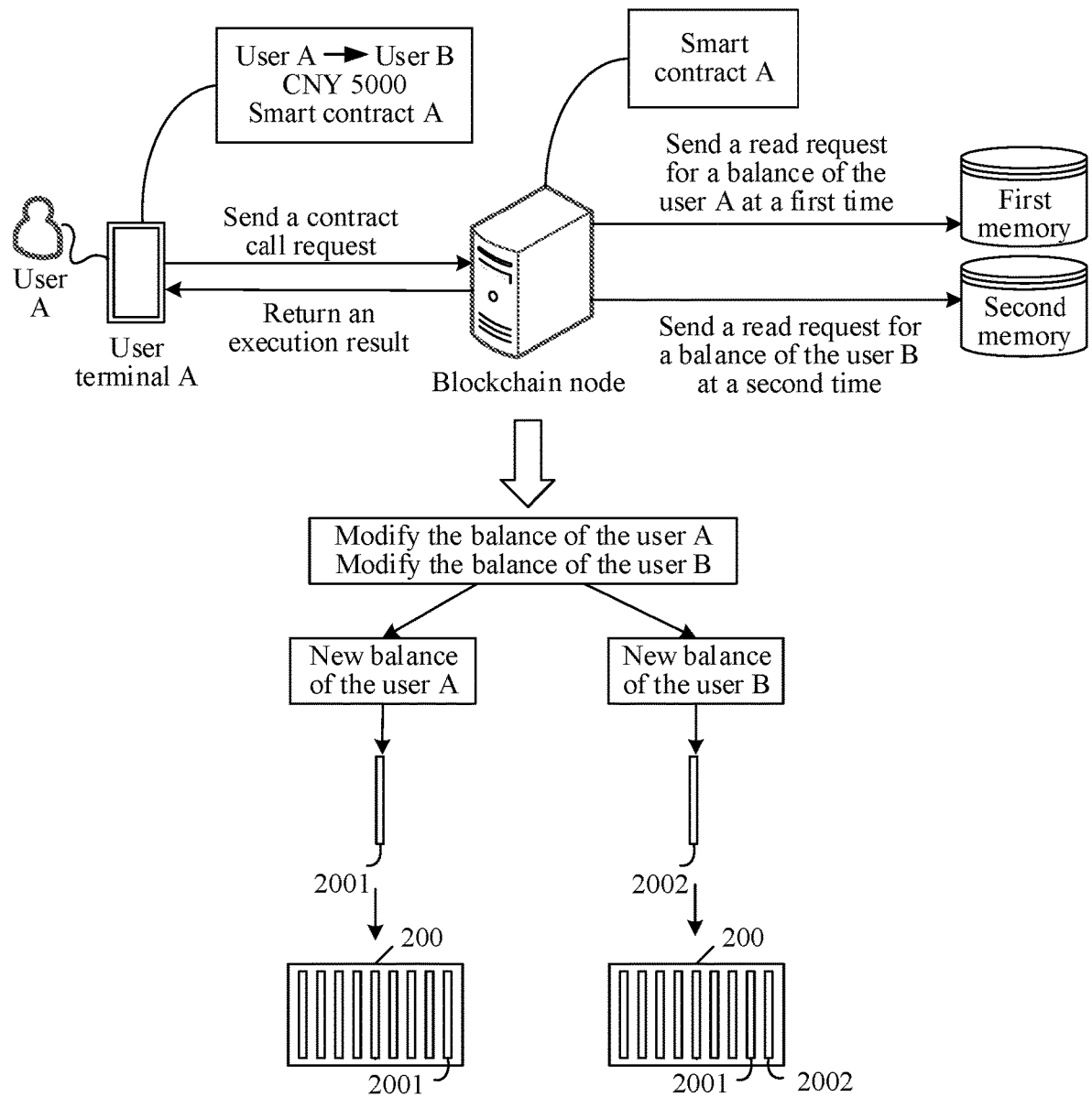
FIG. 2 is a schematic diagram of a scenario according to some embodiments of this application.

For ease of understanding, FIG. 2 is a schematic diagram of a scenario according to some embodiments of this application. A user terminal A shown in FIG. 2 may be any user terminal in the user terminal cluster 10 in the foregoing embodiment corresponding to FIG. 1, for example, the user terminal is 10a. A blockchain node shown in FIG. 2 may be any core node in the core node cluster 1000 in the foregoing embodiment corresponding to FIG. 1. For example, the core node may be the core node cluster 1000b.

As shown in FIG. 2, a user A initiates a transfer transaction service by using the user terminal A (the user A transfers CNY 5000 to a user B), and the user A may select a smart contract (for example, select a smart contract A) in a blockchain 200 by using the user terminal A, that is, the user A may select a smart contract that is in blockchain 200 and that is used for executing the transfer transaction service. Execution logic of the smart contract for the transfer transaction service may be the following five steps:

1. Read a balance of the user A in the blockchain.
2. Read a balance of the user B in the blockchain.
3. Make a logical judgment on transfer and modify the balances of the user A and the user B.
4. Write the latest balance of the user A into the blockchain.
5. Write the latest balance of the user B into the blockchain.

For each step, the smart contract is executed in a serial execution sequence. For example, for step 1, the smart contract first transmits a read request for the balance of the user A, and after the read request for the balance of the user A is transmitted, the smart contract is in a wait mode. After the balance of the user A is read, the smart contract performs step 2, that is, transmits a read request for the balance of the user B. Based on the serial execution sequence, a time cost is increased, and an execution speed of the smart contract is reduced. To increase the execution speed of the smart contract, execution of the smart contract may be divided into a plurality of execution phases, and each phase may include a plurality of steps, so that the plurality of steps can be executed asynchronously and in parallel in one execution phase, thereby reducing a waiting time between every two steps.

Contract code that divides execution of the smart contract into a plurality of phases may be written by the user. The user may add, in the smart contract in a manner of initiating a contract deployment request, a contract program statement (contract code) that is used for perform asynchronous parallel execution on the smart contract. Subsequently, the contract program statement may be called to support the smart contract in an asynchronous parallel execution manner to execute a transaction service.

For example, the contract program statement written by the user may include an asynchronous variable function name, an asynchronous variable statement, a pointer program statement, and a service logic statement, and the asynchronous variable function name may include an asynchronous variable function name 1, an asynchronous variable function name 2, and an asynchronous variable function name 3. The asynchronous variable function name 1 is corresponding to an asynchronous variable statement 1, the asynchronous variable function name 2 is corresponding to an asynchronous variable statement 2, and the asynchronous variable function name 3 is corresponding to an asynchronous variable statement 3. The asynchronous variable function name 1 is corresponding to an execution phase 1, and the execution phase 1 includes step 1 and step 2 (reading the balance of the user A in the blockchain and reading the balance of the user B in the blockchain). The asynchronous variable function name 2 is corresponding to an execution phase 2, and the execution phase 2 includes step 3 (making a logical judgment on transfer and modifying the balances of the user A and the user B). The asynchronous variable function name 3 is corresponding to an execution phase 3, and the execution phase 3 includes step 4 and step 5 (writing the latest balance of the user A into the blockchain, and writing the latest balance of the user B into the blockchain).

That is, when the first asynchronous variable function name is called, the smart contract may run the execution phase 1 by using the asynchronous variable statement 1, that is, perform step 1 and step 2 asynchronously and in parallel. When the asynchronous variable function name 2 is called, the smart contract may run the execution phase 2 by using the asynchronous variable statement 2, that is, perform step 3. However, when the asynchronous variable function name 3 is called, the smart contract may run the execution phase 3 by using the asynchronous variable statement 3, that is, perform step 4 and step 5 asynchronously and in parallel.

The pointer program statement written by the user may be used for indicating a next execution phase to be executed. The pointer program statement may include a pointer program statement 1 and a pointer program statement 2. The pointer program statement 1 may be corresponding to the execution phase 1, and the pointer program statement may point to the execution phase 2, so as to indicate that the execution phase 2 may be executed after execution of the execution phase 1 is completed. The pointer program statement 2 may point to the execution phase 3, so as to indicate that execution phase 3 may be executed after execution of the execution phase 2 is completed. Therefore, by using the pointer program statement, an execution sequence of the smart contract A may be execution phase 1->execution phase 2->execution phase 3.

A user who writes a contract program statement used for supporting asynchronous and parallel running of a smart contract may be the user A, or may be another user different from the user A. In the following, for example, the contract program statement that supports asynchronous and parallel running of the smart contract is written by the user A. The user terminal A may generate a contract deployment request (the specified smart contract is the smart contract A) according to the contract program statement written by the user A, and transmit the contract deployment request to a blockchain node. The blockchain node may deploy, according to the contract deployment request, the asynchronous variable function name 1, the asynchronous variable statement 1, the pointer program statement 1, the asynchronous variable function name 2, the asynchronous variable statement 2, the pointer program statement 2, the asynchronous variable function name 3, the asynchronous variable statement 3, and the service logic statement written by the user A in the specified smart contract. After the deployment is completed, a deployment result is returned to the user terminal A.

Further, the user terminal A may generate a contract call request (the specified smart contract is the smart contract A), and transmit the contract call request to the blockchain node, where the contract call request may include an asynchronous variable function name (for example, a first asynchronous variable function name), an ID of the smart contract A, and a variable parameter. After receiving the contract call request, the blockchain node may call, by using the ID of the smart contract A, the smart contract A in which the contract program statement written by the user A has been deployed. By using the smart contract A, the blockchain node may obtain the asynchronous variable function name 1 of the execution phase 1 and the asynchronous variable statement 1 corresponding to the asynchronous variable statement 1, and may query, according to the asynchronous variable statement 1, a memory 1 used for storing the balance of the user A and a memory 2 used for storing the balance of the user B. Subsequently, the blockchain node may perform step 1 and step 2 asynchronously and in parallel in the execution phase 1 in an asynchronous request manner, that is, the blockchain node may transmit a read request for the balance of the user A to the memory 1 at a first time (for example, 9:00). Subsequently, according to the asynchronous request manner, the blockchain node may continue to transmit a read request for the balance of the user B to the memory 2 at a second time (for example, 9:01) without waiting for the memory 1 to return a query result.

Further, when the memory 1 returns a balance result of the user A and the memory 2 returns a balance result of the user B, execution of the execution phase 1 is completed, and the blockchain node may schedule to the execution phase 2 by using the pointer program statement 1 in the execution phase 1, and perform step 3 in the execution phase 2. In the execution phase 2, the blockchain node may modify the balance of the user A and the balance of the user B by using the service logic statement written by the user A, and obtain a new balance of the user A and a new balance of the user B.

Further, after execution of the execution phase 2 is completed, the blockchain node may schedule to the execution phase 3 by using the pointer program statement 2, and perform step 4 and step 5 asynchronously and in parallel in the execution phase 3. That is, the blockchain node may generate a block 2001 according to the new balance of the user A, and add the block 2001 to a blockchain 200 to complete writing the new balance of the user A into the blockchain 200. Similarly, the blockchain node may also generate a block 2002 according to the new balance of the user B, and add the block 2002 to the blockchain 200 to complete writing the new balance of the user B into the blockchain 200. Then, the blockchain node may return the execution result (transfer success) to the user terminal A. When the user terminal A queries the balance of the user terminal A, the presented balance result is the latest balance of the user A.

In some embodiments code execution of the smart contract is divided into a plurality of execution phases, and steps in each execution phase may be performed asynchronously and in parallel, thereby increasing an execution speed of the smart contract and reducing time costs.

Further, FIG. 3 is a schematic flowchart of a data processing method based on a smart contract according to some embodiments of this application. The method is performed by a computer device. For example, the method may be performed by a blockchain node (for example, the core node in the embodiment corresponding to FIG. 1), or may be jointly performed by a blockchain node and a user terminal (for example, the user terminal in the embodiment corresponding to FIG. 1). The following uses an example in which the method is performed by the blockchain node for description. The data processing method based on a smart contract may include at least the following step S101 to step S103:

Step S101: Acquire a contract call request used for executing a transaction service; the contract call request including a first asynchronous variable function name and a first variable parameter.

In this application, the blockchain node may be a core node in a blockchain, the core node may receive a transaction request (for example, a contract deployment request and a contract call request) transmitted by a data node (or a light node) in the blockchain, and the data node (or the light node) may receive a transaction request transmitted by a user terminal. The transaction request may be a request generated by the user terminal according to a transaction service initiated by the user.

The user may initiate a contract deployment request by using the user terminal, and by using the contract deployment request, the user may add a new contract program statement to a specified smart contract. The contract program statement (contract code) written by the user may include a first asynchronous variable function name, a second asynchronous variable function name, a first asynchronous variable statement corresponding to the first asynchronous variable function name, and a second asynchronous variable statement corresponding to the second asynchronous variable function name. Then, the user terminal may generate a contract deployment request, and transmit the contract deployment request that carries the first asynchronous variable function name, the second asynchronous variable function name, the first asynchronous variable statement, and the second asynchronous variable statement to the data node (or the light node). The data node (or the light node) transmits the contract deployment request to the blockchain node, and the blockchain node may deploy the smart contract according to the contract deployment request.

Contract program statements written by the user may be contract code that support multi-phase asynchronous parallel running of the smart contract, where the first asynchronous variable function name may be corresponding to a first execution phase, and the second asynchronous variable function name may be corresponding to a second execution phase. After deployment is completed, the transaction service initiated by the user may be executed in a plurality of execution phases (for example, the first execution phase and the second execution phase) by calling the first asynchronous variable function name and the second asynchronous variable function name, and the smart contract may be executed asynchronously and in parallel in each execution phase. That is, each execution phase may include a plurality of execution steps of the transaction service, and these steps may be run asynchronously and in parallel in the execution phase.

The user may specify a smart contract in the blockchain to deploy contract program statements written by the user. For example, the user may specify a smart contract by specifying an ID or a name of the smart contract, and a contract call request transmitted by the user terminal to the blockchain node may also carry the ID or the name of the smart contract. In this case, the blockchain node may call the corresponding smart contract by using the ID or the name of the smart contract.

Further, the blockchain node may deploy these contract program statements in the smart contract according to the contract deployment request (including the first asynchronous variable function name, the second asynchronous variable function name, the first asynchronous variable statement corresponding to the first asynchronous variable function name, and the second asynchronous variable statement corresponding to the second asynchronous variable function name).

An example by which the blockchain node deploys the smart contract according to the contract deployment request may be: first acquiring the contract deployment request transmitted by the user terminal; the contract deployment request carrying the first asynchronous variable function name, the second asynchronous variable function name, the first asynchronous variable statement corresponding to the first asynchronous variable function name, and the second asynchronous variable statement corresponding to the second asynchronous variable function name; and then creating a smart contract according to a mapping relationship between the first asynchronous variable function name and the first execution phase and a mapping relationship between the second asynchronous variable function name and the second execution phase; the smart contract including the first asynchronous variable function name, the second asynchronous variable function name, the first asynchronous variable statement, and the second asynchronous variable statement; and both the first execution phase and the second execution phase being execution phases corresponding to the transaction service.

The user may write a pointer program statement in each execution phase, and the pointer program statement may be used for indicating an execution phase to be executed after execution of a current execution phase is completed. By using the pointer program statement in each execution phase, a plurality of execution phases of the transaction service may have an execution sequence. The contract deployment request may further carry the pointer program statement, and the blockchain node may also deploy the pointer program statement in the smart contract according to the contract deployment request.

An example method for deploying the pointer program statement in the smart contract by the blockchain node may be: acquiring, according to the contract deployment request, a pointer program statement corresponding to the first execution phase and a pointer program statement corresponding to the second execution phase; and then deploying the pointer program statement corresponding to the first execution phase and the pointer program statement corresponding to the second execution phase into the smart contract.

After completing deployment of the smart contract, the blockchain node may return a deployment completion result to the user terminal, and further, the user terminal may generate a contract call request for executing a transaction service (for example, a transfer service, a query service, and a storage service), where the contract call request may carry an asynchronous variable function name (for example, a first asynchronous variable function name), a variable parameter (a first variable parameter), and an ID of the smart contract. The user terminal may transmit the contract call request to the blockchain node. After receiving the contract call request, the blockchain node may call the asynchronous variable function name in the specified smart contract according to the contract call request.

The user terminal that transmits the contract deployment request and the user terminal that transmits the contract call request herein may be different user terminals. For example, the user terminal that transmits the contract deployment request is the user terminal A, and the blockchain node may transmit a deployment completion result to the user terminal A after completion of deployment. The blockchain node may also transmit a deployment completion notification to a user terminal B, and the user terminal B may also transmit a contract call request to the blockchain node according to the deployment completion notification. In some examples, after receiving the deployment completion result transmitted by the blockchain node, the user terminal A may also transmit, to the user terminal B, a notification that the blockchain node has completed deployment.

Step S102: Acquire a first asynchronous variable statement corresponding to the first asynchronous variable function name in a smart contract, and query, according to the first asynchronous variable statement, a first memory and a second memory that are associated with the first variable parameter; the first memory being a location at which first to-be-read data is located, and the second memory being a location at which second to-be-read data is located.

In this application, the first variable parameter may be a parameter corresponding to the first to-be-read data and the second to-be-read data. The first to-be-read data and the second to-be-read data may be data used for executing the transaction service. The first to-be-read data and the second to-be-read data need to be read from the blockchain. For example, the transaction service is a transfer service, and the transfer service is transfer from the user A to the user B. In this case, the first to-be-read data may be the balance of the user A, the second to-be-read data may be the balance of the user B, and the balances of the user A and the user B need to be read from the blockchain.

The first asynchronous variable statement may indicate the first memory configured to read the first to-be-read data and the second memory configured to read the second to-be-read data. The first memory and the second memory may be queried by using the first asynchronous variable statement.

Step S103: Separately transmit a data read request to the first memory and the second memory in an asynchronous request manner indicated by the first asynchronous variable statement, to obtain the first to-be-read data and the second to-be-read data that are used for executing the transaction service; a transmitting time stamp used for transmitting the data read request to the second memory being earlier than a return time stamp for the first memory to return the first to-be-read data.

In this application, the first data read request may include a first data read request and a second data read request. An example method for transmitting the data read request to obtain the first to-be-read data and the second to-be-read data may be: transmitting the first data read request to the first memory at a start time stamp in the asynchronous request manner indicated by the first asynchronous variable statement; then transmitting the second data read request to the second memory in a waiting time period; the waiting time period being a time period including the start time stamp and the return time stamp; and then receiving the first to-be-read data returned by the first memory based on the first data read request, and the second to-be-read data returned by the second memory based on the second data read request.

At the start time stamp (for example, 8:00), the blockchain node may transmit the first data read request to the first memory. Subsequently, the blockchain node may continue to transmit the second data read request to the second memory without waiting for the first memory to return a query result. For example, at 8:01, the blockchain node transmits the second data read request to the second memory, and the time stamp 8:01 is after the start time stamp and before the return time stamp when the first memory returns the first to-be-read data. The manner of transmitting the requests is an asynchronous parallel execution manner of the smart contract. By using the asynchronous parallel execution manner, a waiting time may be reduced and the execution speed of the smart contract is increased.

Figure 4:
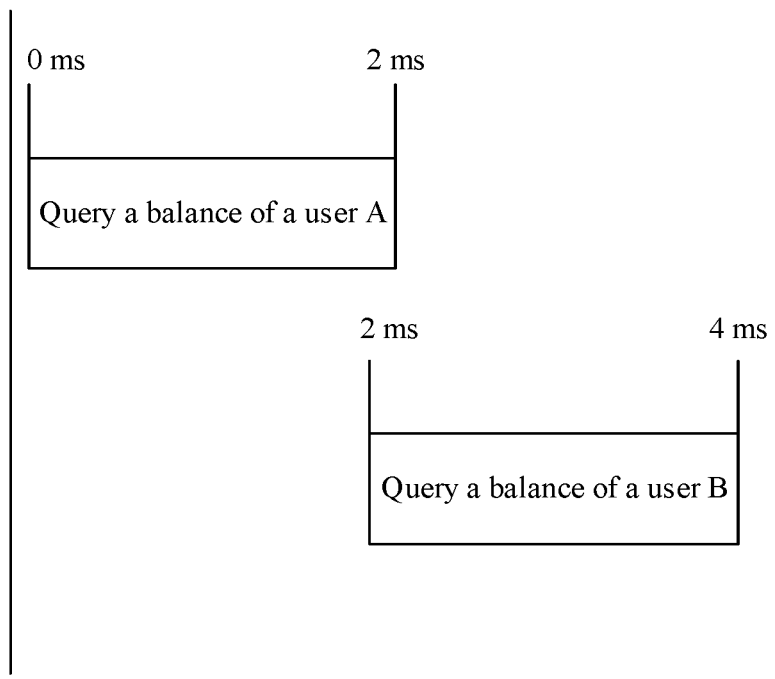
FIG. 4 and FIG. 5 are schematic diagrams of a time consumption comparison between a serial wait mode and an asynchronous parallel mode according to some embodiments of this application.
Figure 5:
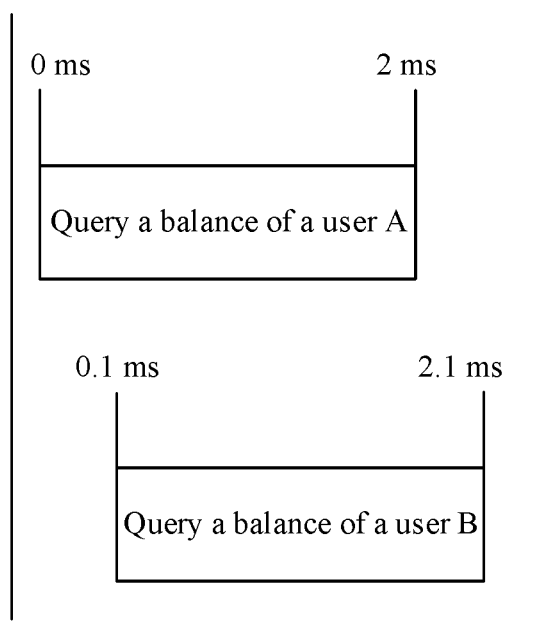

For ease of understanding a beneficial effect of the asynchronous execution manner, referring to FIG. 4 and FIG. 5, FIG. 4 and FIG. 5 are schematic diagrams of time consumption comparison between a serial wait mode and an asynchronous parallel mode according to some embodiments of this application. As shown in FIG. 4, FIG. 4 is a serial waiting mode. For the two steps of querying a balance of a user A and querying a balance of a user B, it is assumed that both the balance of the user A and the balance of the user B are stored in distributed storage. If 2 ms is required for querying the distributed storage, querying the balance of the user A (transmitting a data read request for the user A to a memory and obtaining a balance result returned by the memory) consumes 2 ms (that is, 0 ms-2 ms). Subsequently, 2 ms (that is, 2 ms-4 ms) is consumed for querying the balance of the user B (transmitting a data read request for the user B to the memory and obtaining a balance result returned by the memory). In the serial waiting mode, a total time of 4 ms is consumed for querying the balances of the user A and the user B.

However, as shown in FIG. 5, FIG. 5 is an asynchronous parallel mode. For the two steps of querying a balance of a user A and querying a balance of a user B, it is assumed that both the balance of the user A and the balance of the user B are stored in distributed storage. If 2 ms is required for querying the distributed storage, querying the balance of the user A (transmitting a data read request for the user A to a memory and obtaining a balance result returned by the memory) consumes 2 ms (that is, 0 ms-2 ms). After transmitting the data read request for the user A to the memory in the asynchronous parallel mode, the blockchain node may transmit the data read request for the user B to the memory without needing to wait for the memory to return a balance result. For example, as shown in FIG. 5, if the data read request for the user B is transmitted at 0.1 ms to query the balance of the user B (transmitting the data read request for the user B to the memory and obtaining a balance result returned by the memory), 2 ms (that is, 0.1 ms-2.1 ms) is consumed. In the asynchronous parallel mode, a total time of 2.1 ms is consumed to query the balances of the user A and the user B.

It can be learned that because the consumption time 2.1 ms is far less than the consumption time 4 ms, by performing the smart contract asynchronously and in parallel, the time cost can be reduced, and the execution speed of the smart contract can be increased.

The first asynchronous variable statement may be a contract statement that belongs to a first execution phase in the smart contract, and the first to-be-read data and the second to-be-read data may be data obtained in the first execution phase. That is, a process of initiating the first data read request and the second data read request to obtain the first to-be-read data and the second to-be-read data is performed in the first execution phase. After the first execution phase is executed (that is, when the first to-be-read data and the second to-be-read data are successfully read), a next execution phase (for example, a second execution phase) to be executed after the first execution phase may be acquired by using a pointer program statement corresponding to the first execution phase. Subsequently, the next execution phase to which the pointer program statement points may be scheduled, and the transaction service is executed in the execution phase.

An example method for executing the transaction service in the next execution phase (for example, the second execution phase) after scheduling to the next execution phase to be executed after the first execution phase may be: acquiring at least two pointer program statements corresponding to the first execution phase when the first to-be-read data and the second to-be-read data are successfully read in the first execution phase; the at least two pointer program statements being used for indicating a subsequent execution phase of the first execution phase; then determining, according to the first to-be-read data and the second to-be-read data, a target pointer program statement that meets a scheduling condition in the at least two pointer program statements; then scheduling, by using the smart contract, to a second execution phase indicated by the target pointer program statement; the second execution phase belonging to a subsequent execution phase of the first execution phase; and executing, in the second execution phase, the transaction service according to the first to-be-read data returned by the first memory and the second to-be-read data returned by the second memory.

Each pointer program statement in the at least two pointer program statements may be associated with a different scheduling condition. An example method for determining, according to the first to-be-read data and the second to-be-read data, the target pointer program statement that meets the scheduling condition in the at least two pointer program statements may be as follows: first acquiring a data relationship between the first to-be-read data and the second to-be-read data; then determining, from the scheduling condition associated with each pointer program statement, a scheduling condition met by the data relationship, and determining the scheduling condition met by the data relationship as a target scheduling condition; and then determining a pointer program statement associated with the target scheduling condition as the target pointer program statement.

In the first execution phase, a plurality of pointer program statements may be included, and each pointer program statement may be associated with a different scheduling condition. For example, the pointer program statements included in the first execution phase are a pointer program statement 1 and a pointer program statement 2, where a scheduling condition associated with the pointer program statement 1 is a>100 and b<100, and a scheduling condition associated with the pointer program statement 2 is a>100 and b>100. The first to-be-read data read in the first execution phase is 101, the second to-be-read data is 103, the first to-be-read data 101 is read data corresponding to a variable parameter a, and the second to-be-read data 103 is read data corresponding to a variable parameter b. It may be learned that if a data relationship between the first to-be-read data 101 and the second to-be-read data 103 meets the scheduling condition a>100 and b>100, the pointer program statement 2 may be determined as the target pointer program statement, and an execution phase to which the pointer program statement 2 points may be determined as a subsequent execution phase of the first execution phase.

In some examples, the first execution phase includes at least two pointer program statements, and each execution phase (including the first execution phase) may also include one pointer program statement. After execution of the execution phase, the target pointer program statement does not need to be determined according to an execution result of each execution phase, and the pointer program statement may be directly used as the target pointer program statement and an execution phase to which the pointer program statement points may be scheduled.

In the second execution phase, an example method for executing the transaction service according to the first to-be-read data and the second to-be-read data may be as follows: acquiring a second asynchronous variable statement corresponding to the second execution phase in the smart contract; then acquiring a target variable parameter expected to be read by the second asynchronous variable statement; determining target to-be-read data according to the target variable parameter, the first to-be-read data, and the second to-be-read data; the target to-be-read data being data used for executing the transaction service in the second execution phase; and executing the transaction service in the second execution phase according to the target to-be-read data.

An example method for executing the transaction service in the second execution phase according to the target to-be-read data may be: determining the first to-be-read data and the second to-be-read data as the target to-be-read data when the target variable parameter includes the first variable parameter and the target variable parameter does not include the second variable parameter (the second variable parameter may be the variable parameter included in the contract call request); querying, according to the second asynchronous variable statement, a target memory associated with the second variable parameter when the target variable parameter includes the first variable parameter and the target variable parameter includes the second variable parameter; and determining the target to-be-read data according to the target memory, the first to-be-read data, and the second to-be-read data.

An example method for determining the target to-be-read data according to the target memory, the first to-be-read data, and the second to-be-read data may be: transmitting a target data read request to the target memory in an asynchronous request manner indicated by the second asynchronous variable statement; and receiving third to-be-read data returned by the target memory according to the target data read request, and determining the third to-be-read data, the first to-be-read data, and the second to-be-read data as the target to-be-read data.

The asynchronous variable statement in each execution phase may indicate, in a form of a variable parameter, data used in the current execution phase. If execution of the second execution phase depends on the execution result of the first execution phase, the second asynchronous variable statement in the second execution phase also indicates a variable parameter (that is, the first variable parameter) corresponding to the first to-be-read data and the second to-be-read data. In this case, because the first to-be-read data and the second to-be-read data have been read in the first execution phase, the first to-be-read data and the second to-be-read data may be directly used in the second execution phase as the target to-be-read data. If the data used for executing the second execution phase is not only the first to-be-read data and the second to-be-read data, but also includes other to-be-read data (for example, third to-be-read data), the second asynchronous variable statement in the second execution phase indicates not only the first variable parameter, but also a second variable parameter corresponding to the third to-be-read data, and indicates a target memory used for storing the third to-be-read data. In addition, the blockchain node may transmit a target data read request to the target memory, and use the third to-be-read data returned by the target memory according to the target data read request and the first to-be-read data and the second to-be-read data as the target to-be-read data.

Further, after the target to-be-read data is determined, the transaction service may be executed in the second execution phase. An example method may be: acquiring a service logic statement corresponding to the second execution phase; and performing a logical operation on the target to-be-read data according to a data processing logic indicated by the service logic statement, to obtain a transaction execution result corresponding to the transaction service. The service logic statement may be a program statement written by the user. After generating the contract deployment request, the user terminal may transmit the service logic statement together with the contract deployment request to the blockchain node, and the blockchain node may deploy the service logic statement in the smart contract.

Further, after the transaction execution result corresponding to the transaction service is obtained, the transaction execution result may be chained to the blockchain. An example method may be: generating, according to the transaction execution result, a block to be added to a blockchain; the blockchain being a blockchain to which the smart contract belongs; and then broadcasting the block to a consensus node on the blockchain, and adding the block to the blockchain when the consensus node passes consensus on the block. After the transaction execution result is successfully chained, the blockchain node may return the transaction execution result to the user terminal, and the user terminal may display the transaction execution result on a display screen, so that the user can view the transaction execution result of the transaction service on the display screen.

Figure 6:
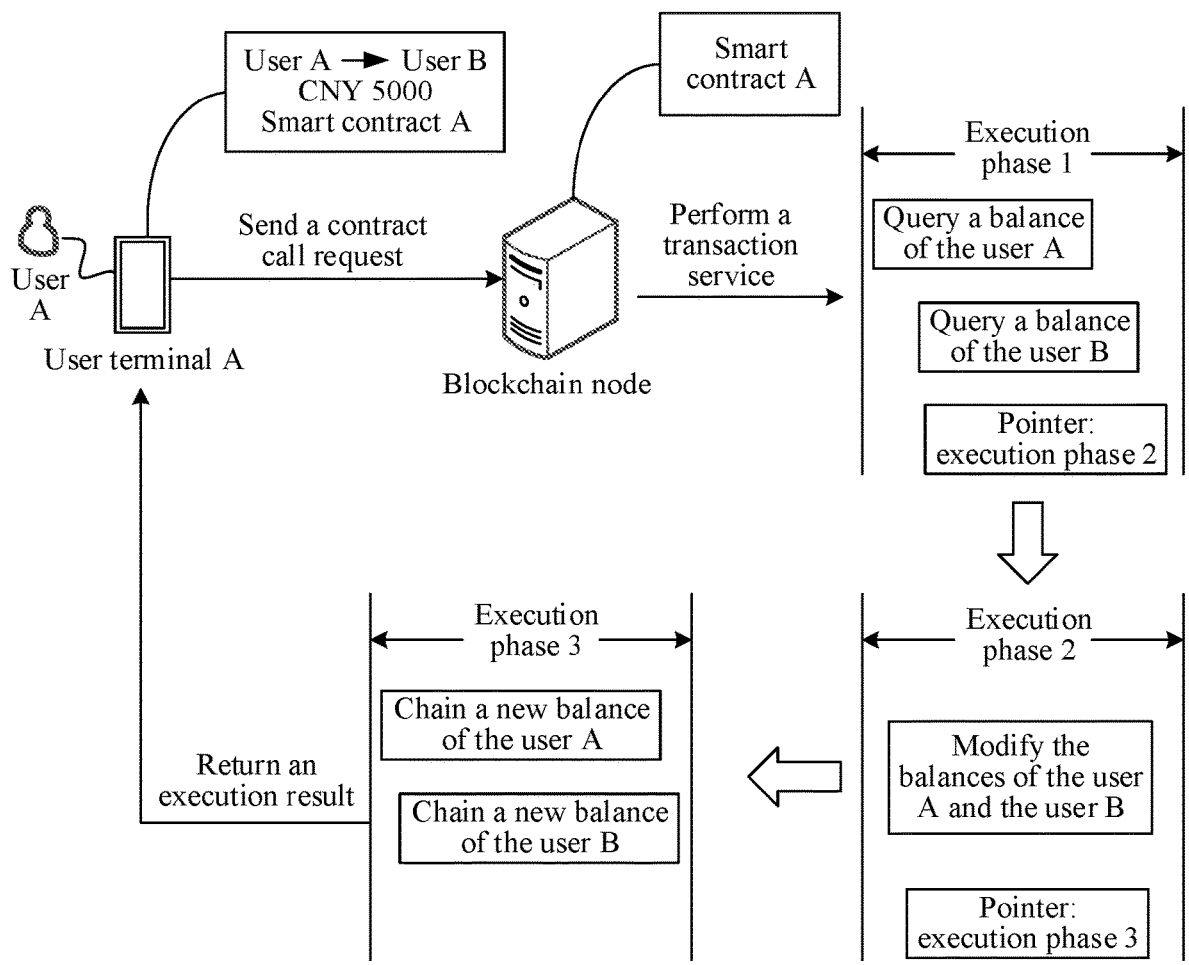
FIG. 6 is a schematic diagram of executing a transaction service in a plurality of phases according to some embodiments of this application.

To facilitate understanding of multi-phase execution of a transaction service, reference may be made to FIG. 6. FIG. 6 is a schematic diagram of executing a transaction service in a plurality of phases according to some embodiments of this application. As shown in FIG. 6, a user A transmits, to a blockchain node by using a user terminal A, a contract call request used for executing a transfer service (the user A transfers CNY 5000 to a user B). After receiving the contract call request, the blockchain node may call a smart contract in which a contract program statement (to support multi-phase asynchronous parallel execution of the smart contract and execution of the transaction service) has been deployed.

The contract program statement may divide the transaction service into three execution phases (including an execution phase 1, an execution phase 2, and an execution phase 3) for execution, where the execution phase 1 is the first execution phase, and when the transaction service is executed, the execution phase 1 is first entered, and performs a corresponding step asynchronously in the execution phase 1, where the step may be a step included in the execution phase 1. For example, this step is "query a balance of the user A and query a balance of the user B". Then, after the balance of the user A and the balance of the user B are queried in the execution phase 1, it may be determined that execution of the execution phase 1 is completed. In this case, a next execution phase after the execution phase 1 (for example, the execution phase 2 shown in FIG. 6) may be acquired by using a pointer program statement in the execution phase 1.

Further, a corresponding step may be asynchronously executed in the execution phase 2, and the step may be a step included in the execution phase 2. For example, the step is "perform logical processing of transfer to modify the balances of the user A and the user B". Subsequently, after execution of the execution phase 2, a next execution phase after the execution phase 2 (for example, the execution phase 3 shown in FIG. 6) may be acquired by using a pointer program statement in the execution phase 2.

Further, a corresponding step may be asynchronously executed in the execution phase 3. The step may be a step included in the execution phase 3. For example, the step is "chain a new balance of the user A and a new balance of the user B". After the new balances of the user A and the user B are successfully stored in a blockchain to which the smart contract belongs, it may be determined that execution of the execution phase 3 is completed. After execution of the execution phase 3, it may be determined that the transaction service is executed, and the blockchain node may return an execution result to the user terminal. The user may view the execution result by using the user terminal.

In this embodiment of this application, the user may deploy, in a smart contract in a manner of initiating a contract deployment request, a program statement that is used for supporting the smart contract to perform multi-phase asynchronous parallel execution, and then the user may call the smart contract that has been deployed on the blockchain. In this case, each node on the blockchain may run the same smart contract. Because an asynchronous variable function name and an asynchronous variable statement are deployed in the smart contract to support asynchronous execution of the smart contract, the asynchronous variable function name and the asynchronous variable statement may be used for supporting multi-phase asynchronous running of a transaction service by using the asynchronous variable function name and the asynchronous variable statement. During data reading in asynchronous running, after a data read request for first to-be-read data is transmitted, a data read request for second to-be-read data is not transmitted after waiting for a read result of the first to-be-read data, but the data read request for the second to-be-read data continues to be transmitted before the read result of the first to-be-read data is obtained. That is, for running of the smart contract, switching from a serial waiting mode to a multi-phase asynchronous parallel mode can avoid waiting, reduce a running time, and increase an execution speed of the smart contract.

Figure 7:
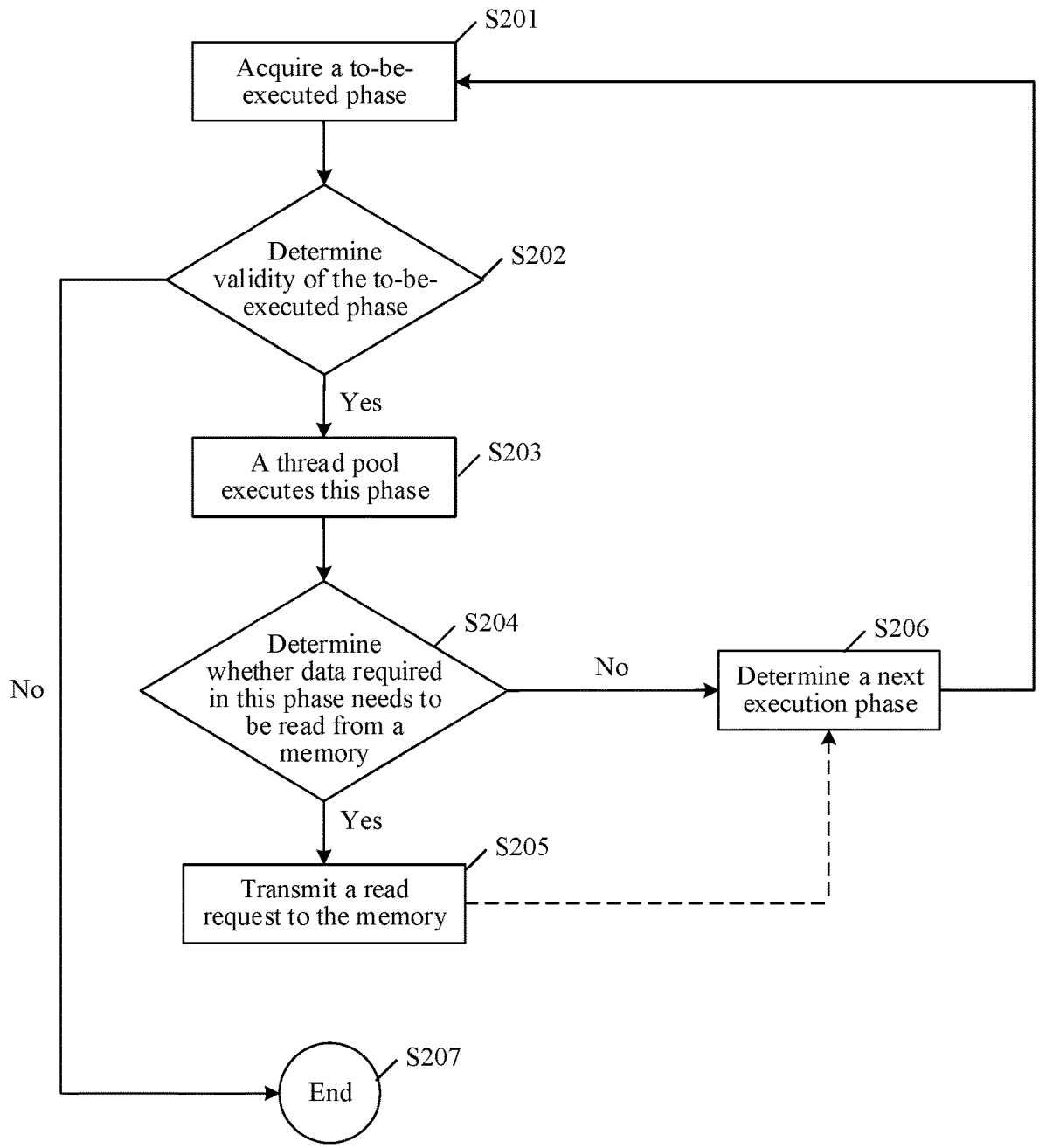
FIG. 7 is a schematic flowchart of execution by phase according to some embodiments of this application.

Further, FIG. 7 is a schematic flowchart of execution by phase according to some embodiments of this application. The method is performed by a computer device. For example, the method may be performed by a blockchain node (for example, the core node in the embodiment corresponding to FIG. 1), or may be jointly performed by a blockchain node and a user terminal (for example, the user terminal in the embodiment corresponding to FIG. 1). As shown in FIG. 7, the procedure can include the following steps.

Step S201: Acquire a to-be-executed phase.

In this application, a transaction service may be executed in a plurality of execution phases, and each execution phase may be acquired by using a pointer program statement. For example, the execution phase may be acquired by using a pointer program statement "phase.execute ( )" and used as a to-be-executed phase.

Step S202: Determine validity of the to-be-executed phase.

In this application, after the to-be-executed phase is acquired, validity of the to-be-executed phase may be first determined, and a method for determining validity of the to-be-executed phase may be determined by using a program statement. Whether the to-be-executed phase is null may be determined by using a program statement. If it is determined by using the program statement that the to-be-executed phase is null, it may be determined that the to-be-executed phase is not valid. If it is determined by using the program statement that the to-be-executed phase is a non-null value, it may be determined that the to-be-executed phase is valid.

Step S203: A thread pool executes this phase.

In this application, when determining that the to-be-executed phase is valid, processing corresponding to the to-be-executed phase may be performed by using the thread pool.

Step S204: Determine whether data used in this phase is read from a memory.

In this application, an asynchronous variable statement is corresponding to each execution phase. The asynchronous variable statement may indicate data used in a current execution phase (for example, the data is an execution result of a previous execution phase), and the asynchronous variable statement may also indicate a memory corresponding to the data used in the current execution phase, so as to indicate that the data is acquired by reading the memory.

Step S205: Transmit a read request to the memory.

In this application, the read request is a data read request. If the data used in the current execution phase is read from the memory, the data read request may be transmitted to the memory according to an asynchronous request manner indicated by a current asynchronous variable statement.

Step S206: Determine a next execution phase.

In this application, after the data read request is transmitted to the memory, if a read result returned asynchronously by the memory is received, it may be determined that the current execution phase is completed, and a pointer program statement of the current execution phase may be acquired, and the next execution phase is determined by using the pointer program statement. The next execution phase may be used as a new to-be-executed phase.

In step S205, if the current execution phase does not need to read the memory, after execution of the current execution phase is completed, a pointer program statement may be acquired, and the next execution phase is acquired by using the pointer program statement. The next execution phase may be used as a new to-be-executed phase.

Step S207: End the procedure.

In this application, in step S202, if it is determined that the to-be-executed phase is null, it may be determined that the to-be-executed phase has no validity, and the execution procedure of the phase may be ended. After execution is completed in all execution phases of a transaction service, a final to-be-executed phase is null, so that a process executed in this phase can be ended.

The program statements such as the asynchronous variable statement and the pointer program statement may be written by the user and deployed in the smart contract. For an example method for deploying the smart contract and calling the smart contract, refer to the description in the embodiment corresponding to FIG. 3.

In this embodiment of this application, the smart contract may be supported to perform multi-phase asynchronous parallel execution by deploying a program statement that is used for supporting asynchronous parallel execution of the smart contract. That is, for running of the smart contract, switching from a serial waiting mode to a multi-phase asynchronous parallel mode can avoid waiting, reduce a running time, and increase an execution speed of the smart contract.

Figure 8:
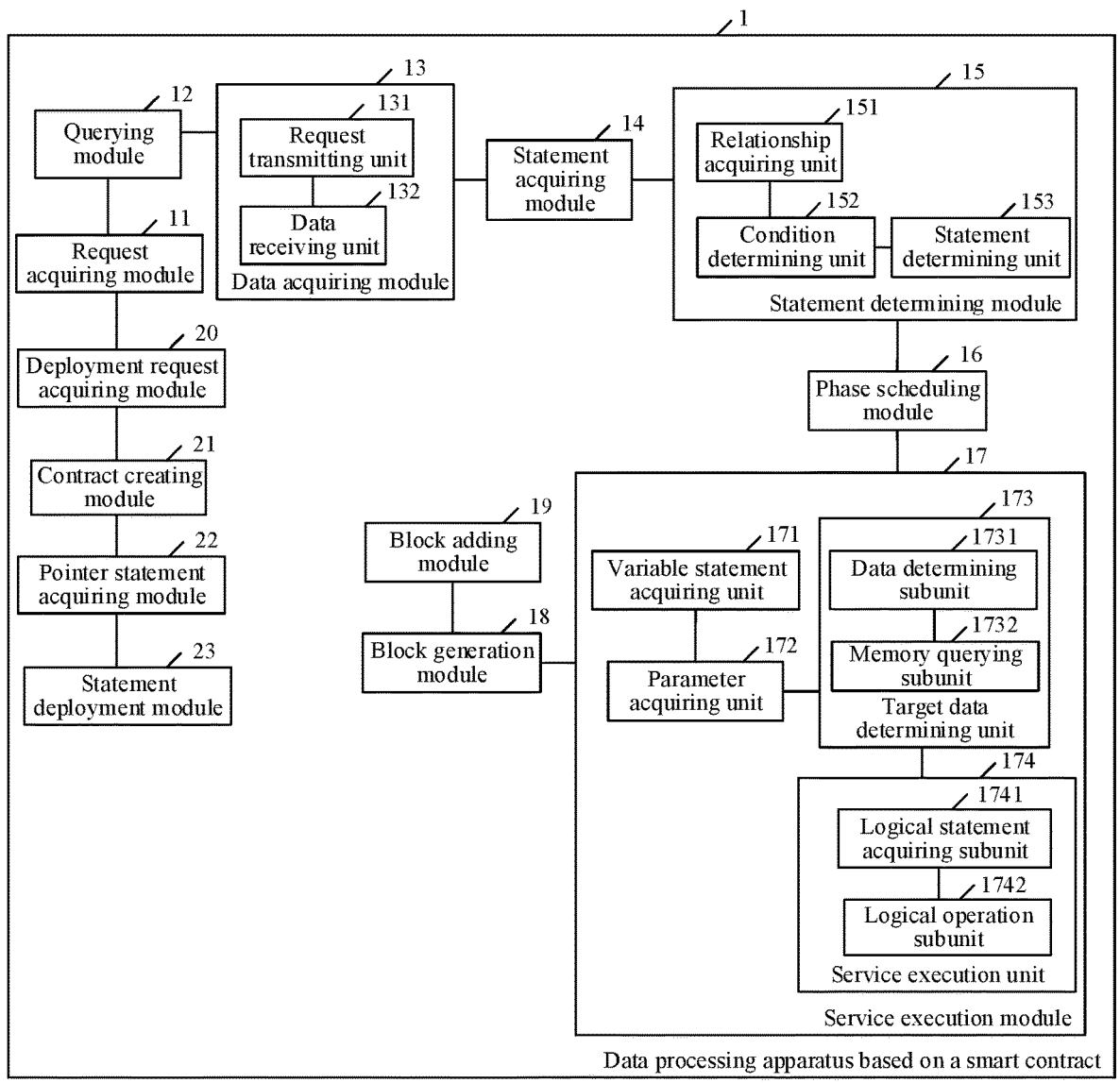
FIG. 8 is a schematic structural diagram of a data processing apparatus based on a smart contract according to some embodiments of this application.

Further, FIG. 8 is a schematic structural diagram of a data processing apparatus based on a smart contract according to some embodiments of this application. The data processing apparatus based on a smart contract may be a computer program (including program code) running on a computer device, for example, the data processing apparatus based on a smart contract is application software. The apparatus may be configured to perform corresponding steps in the method provided in this embodiment of this application. The data processing apparatus 1 based on a smart contract may include: a request acquiring module 11, a querying module 12, and a data acquiring module 13.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The request acquiring module 11 is configured to acquire a contract call request used for executing a transaction service; the contract call request including a first asynchronous variable function name and a first variable parameter;

the querying module 12 is configured to: acquire a first asynchronous variable statement corresponding to the first asynchronous variable function name in a smart contract, and query, according to the first asynchronous variable statement, a first memory and a second memory that are associated with the first variable parameter; the first memory being a location at which first to-be-read data is located, and the second memory being a location at which second to-be-read data is located; and the data acquiring module 13 is configured to separately transmit a data read request to the first memory and the second memory in an asynchronous request manner indicated by the first asynchronous variable statement, to obtain the first to-be-read data and the second to-be-read data that are used for executing the transaction service; a transmitting time stamp used for transmitting the data read request to the second memory being earlier than a return time stamp for the first memory to return the first to-be-read data.

For example implementations of the request acquiring module 11, the querying module 12, and the data acquiring module 13, reference may be made to the description of step S101 to step S103 in the embodiment corresponding to FIG. 3.

The data read request includes a first data read request and a second data read request.

Referring to FIG. 8, the data acquiring module 13 may include: a request transmitting unit 131 and a data receiving unit 132.

The request transmitting unit 131 is configured to transmit the first data read request to the first memory at a start time stamp in the asynchronous request manner indicated by the first asynchronous variable statement.

The request transmitting unit 131 is further configured to transmit the second data read request to the second memory in a waiting time period; the waiting time period being a time period including the start time stamp and the return time stamp.

The data receiving unit 132 is configured to receive the first to-be-read data returned by the first memory based on the first data read request, and the second to-be-read data returned by the second memory based on the second data read request.

For example implementations of the request transmitting unit 131 and the data receiving unit 132, reference may be made to the foregoing description of step S103 in the embodiment corresponding to FIG. 3.

The first asynchronous variable statement is a contract statement that belongs to a first execution phase in the smart contract. The first to-be-read data and the second to-be-read data are obtained in the first execution phase.

Referring to FIG. 8, the data processing apparatus 1 may further include: a statement acquiring module 14, a statement determining module 15, a phase scheduling module 16, and a service execution module 17.

The statement acquiring module 14 is configured to: acquire at least two pointer program statements corresponding to the first execution phase when the first to-be-read data and the second to-be-read data are successfully read in the first execution phase; the at least two pointer program statements being used for indicating a subsequent execution phase of the first execution phase;

the statement determining module 15 is configured to determine, according to the first to-be-read data and the second to-be-read data, a target pointer program statement that meets a scheduling condition in the at least two pointer program statements;

the phase scheduling module 16 is configured to schedule, by using the smart contract, to a second execution phase indicated by the target pointer program statement; the second execution phase belonging to a subsequent execution phase of the first execution phase; and the service execution module 17 is configured to execute, in the second execution phase, the transaction service according to the first to-be-read data returned by the first memory and the second to-be-read data returned by the second memory.

For example implementations of the statement acquiring module 14, the statement determining module 15, the phase scheduling module 16, and the service execution module 17, reference may be made to the description of step S103 in the embodiment corresponding to FIG. 3.

Each pointer program statement in the at least two pointer program statements is associated with a different scheduling condition.

Referring to FIG. 8, the statement determining module 15 may include: a relationship acquiring unit 151, a condition determining unit 152, and a statement determining unit 153.

The relationship acquiring unit 151 is configured to acquire a data relationship between the first to-be-read data and the second to-be-read data;

the condition determining unit 152 is configured to: determine, from the scheduling condition associated with each pointer program statement, a scheduling condition met by the data relationship, and determine the scheduling condition met by the data relationship as a target scheduling condition; and the statement determining unit 153 is configured to determine a pointer program statement associated with the target scheduling condition as the target pointer program statement.

For example implementations of the relationship acquiring unit 151, the condition determining unit 152, and the statement determining unit 153, reference may be made to the foregoing description of step S103 in the embodiment corresponding to FIG. 3.

Referring to FIG. 8, the service execution module 17 may include: a variable statement acquiring unit 171, a parameter acquiring unit 172, a target data determining unit 173, and a service execution unit 174.

The variable statement acquiring unit 171 is configured to acquire a second asynchronous variable statement corresponding to the second execution phase in the smart contract;

the parameter acquiring unit 172 is configured to acquire a target variable parameter expected to be read by the second asynchronous variable statement;

the target data determining unit 173 is configured to determine target to-be-read data according to the target variable parameter, the first to-be-read data, and the second to-be-read data; the target to-be-read data being data used for executing the transaction service in the second execution phase; and the service execution unit 174 is configured to execute the transaction service in the second execution phase according to the target to-be-read data.

For example implementations of the variable statement acquiring unit 171, the parameter acquiring unit 172, the target data determining unit 173, and the service execution unit 174, reference may be made to the description in step S103 in the embodiment corresponding to FIG. 3.

The contract call request further includes a second variable parameter.

Referring to FIG. 8, the target data determining unit 173 may include: a data determining subunit 1731 and a memory querying subunit 1732.

In some embodiments, the data determining subunit 1731 is configured to: determine the first to-be-read data and the second to-be-read data as the target to-be-read data when the target variable parameter includes the first variable parameter and the target variable parameter does not include the second variable parameter.

In another embodiment, the memory query subunit 1732 is configured to: query, according to the second asynchronous variable statement, a target memory associated with the second variable parameter when the target variable parameter includes the first variable parameter and the target variable parameter includes the second variable parameter; and the data determining subunit 1731 is configured to determine the target to-be-read data according to the target memory, the first to-be-read data, and the second to-be-read data.

For example implementations of the data determining subunit 1731 and the memory querying subunit 1732, reference may be made to the description in step S103 in the embodiment corresponding to FIG. 3.

The data determining subunit 1731 is further configured to transmit a target data read request to the target memory in an asynchronous request manner indicated by the second asynchronous variable statement; and the data determining subunit 1731 is further configured to: receive third to-be-read data returned by the target memory according to the target data read request, and determine the third to-be-read data, the first to-be-read data, and the second to-be-read data as the target to-be-read data.

The service execution unit 174 may include: a logical statement acquiring subunit 1741 and a logical operation subunit 1742.

The logical statement acquiring subunit 1741 is configured to acquire a service logic statement corresponding to the second execution phase; and the logical operation subunit 1742 is configured to perform a logical operation on the target to-be-read data according to a data processing logic indicated by the service logic statement, to obtain a transaction execution result corresponding to the transaction service.

For example implementations of the logical statement acquiring subunit 1741 and the logical operation subunit 1742, reference may be made to the description in step S103 in the embodiment corresponding to FIG. 3.

Referring to FIG. 8, the data processing apparatus 1 may further include: a block generation module 18 and a block adding module 19.

The block generation module 18 is configured to generate, according to the transaction execution result, a block to be added to a blockchain; the blockchain being a blockchain to which the smart contract belongs; and the block adding module 19 is configured to broadcast the block to a consensus node on the blockchain, and add the block to the blockchain when the consensus node passes consensus on the block.

For example implementations of the block generation module 18 and the block adding module 19, reference may be made to the description in step S103 in the embodiment corresponding to FIG. 3.

Referring to FIG. 8, the data processing apparatus 1 may further include: a deployment request acquiring module 20 and a contract creating module 21.

The deployment request acquiring module 20 is configured to acquire a contract deployment request transmitted by a user terminal; the contract deployment request carrying the first asynchronous variable function name, a second asynchronous variable function name, the first asynchronous variable statement, and the second asynchronous variable statement corresponding to the second asynchronous variable function name; and the contract creating module 21 is configured to create a smart contract according to a mapping relationship between the first asynchronous variable function name and the first execution phase and a mapping relationship between the second asynchronous variable function name and the second execution phase; the smart contract including the first asynchronous variable function name, the second asynchronous variable function name, the first asynchronous variable statement, and the second asynchronous variable statement; and both the first execution phase and the second execution phase being execution phases corresponding to the transaction service.

For example implementations of the deployment request acquiring module 20 and the contract creating module 21, reference may be made to the description in step S101 in the embodiment corresponding to FIG. 3.

The contract deployment request further carries a pointer program statement.

Referring to FIG. 8, the data processing apparatus 1 may further include: a pointer statement acquiring module 22 and a statement deployment module 23.

The pointer statement acquiring module 22 is configured to acquire, according to the contract deployment request, a pointer program statement corresponding to the first execution phase and a pointer program statement corresponding to the second execution phase; and the statement deployment module 23 is configured to deploy the pointer program statement corresponding to the first execution phase and the pointer program statement corresponding to the second execution phase into the smart contract.

For example implementations of the pointer statement acquiring module 22 and the statement deployment module 23, reference may be made to the description in step S101 in the embodiment corresponding to FIG. 3.

In this embodiment of this application, the user may deploy, in a smart contract in a manner of initiating a contract deployment request, a program statement that is used for supporting the smart contract to perform multi-phase asynchronous parallel execution, and then the smart contract that has been deployed on the blockchain may be called. In this case, each node on the blockchain may run the same smart contract. Because an asynchronous variable function name and an asynchronous variable statement are deployed in the smart contract to support multi-phase asynchronous execution of the smart contract, the asynchronous variable function name and the asynchronous variable statement may be used for supporting multi-phase asynchronous running by using the asynchronous variable function name and the asynchronous variable statement. During data reading in asynchronous running, after a data read request for first to-be-read data is transmitted, a data read request for second to-be-read data is not transmitted after waiting for a read result of the first to-be-read data, but the data read request for the second to-be-read data continues to be transmitted before the read result of the first to-be-read data is obtained. That is, for running of the smart contract, switching from a serial waiting mode to a multi-phase asynchronous parallel mode can avoid waiting, reduce a running time, and increase an execution speed of the smart contract.

Figure 9:
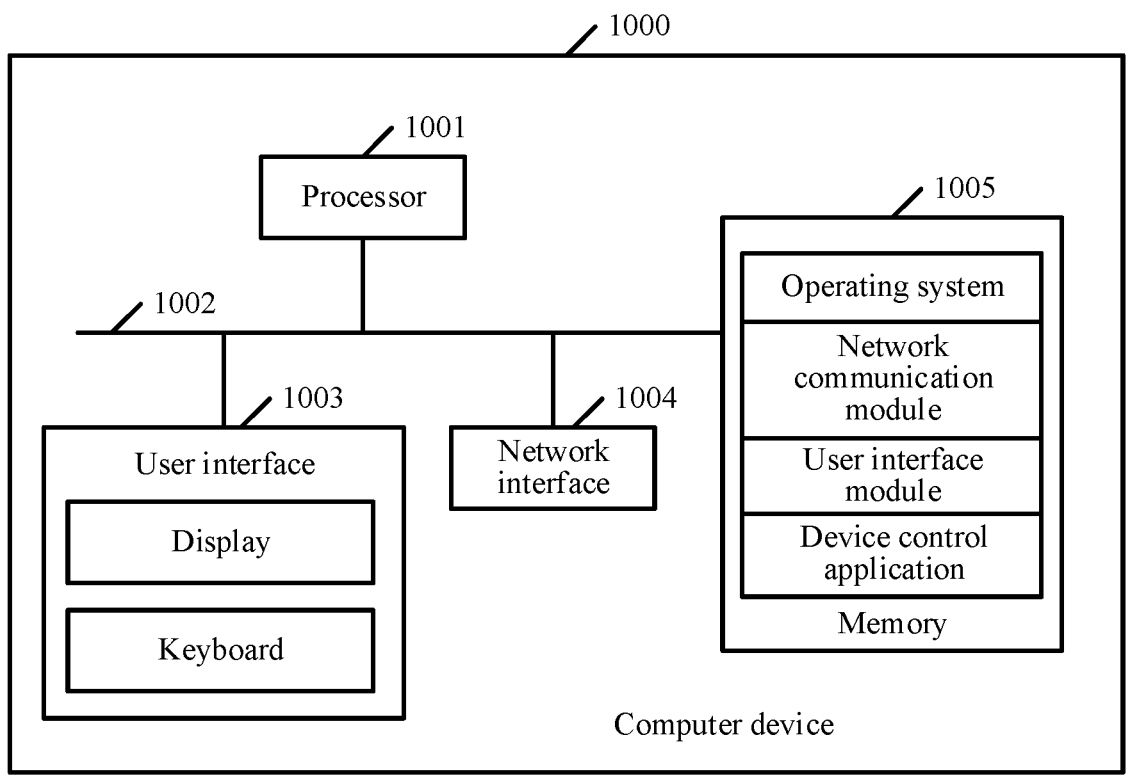
FIG. 9 is a schematic structural diagram of a computer device according to some embodiments of this application.

Further, FIG. 9 is a schematic structural diagram of a computer device according to some embodiments of this application. As shown in FIG. 9, the apparatus 1 in the foregoing embodiment corresponding to FIG. 8 may be applied to the foregoing computer device 1000, and the foregoing computer device 1000 may include: a processor 1001, a network interface 1004, and a memory 1005. In addition, the foregoing computer device 1000 further includes: a user interface 1003 and at least one communication bus 1002. The communication bus 1002 is configured to implement connection and communication between the components. The user interface 1003 may include a display, a keyboard, and in some examples, the user interface 1003 may further include a standard wired interface and a standard wireless interface. In some examples, the network interface 1004 may include a standard wired interface and a standard wireless interface (such as a Wi-Fi interface). The memory 1005 may be a high-speed RAM memory, or may be a non-volatile memory, for example, at least one magnetic disk memory. In some examples, the memory 1005 may be further at least one storage apparatus away from the processor 1001. As shown in FIG. 9, the memory 1005 used as a non-transitory computer-readable storage medium may include an operating system, a network communication module, a user interface module, and a device-control application program.

In the computer device 1000 shown in FIG. 9, the network interface 1004 may provide a network communication function, the user interface 1003 is mainly configured to provide an input interface for a user, and The processor 1001 may be configured to call the device control application program stored in the memory 1005 to implement:

acquiring a contract call request used for executing a transaction service; the contract call request including a first asynchronous variable function name and a first variable parameter;

acquiring a first asynchronous variable statement corresponding to the first asynchronous variable function name in a smart contract, and querying, according to the first asynchronous variable statement, a first memory and a second memory that are associated with the first variable parameter; the first memory being a location at which first to-be-read data is located, and the second memory being a location at which second to-be-read data is located; and separately transmitting a data read request to the first memory and the second memory in an asynchronous request manner indicated by the first asynchronous variable statement, to obtain the first to-be-read data and the second to-be-read data that are used for executing the transaction service; a transmitting time stamp used for transmitting the data read request to the second memory being earlier than a return time stamp for the first memory to return the first to-be-read data.

The computer device 1000 described in this embodiment of this application may implement the descriptions of the data processing method based on a smart contract in the foregoing embodiment corresponding to FIG. 3, and can also implement the descriptions of the data processing apparatus 1 based on a smart contract in the foregoing embodiment corresponding to FIG. 8.

In addition, the embodiments of this application further provide a non-transitory computer-readable storage medium. The non-transitory computer-readable storage medium stores a computer program executed by the data processing computer device 1000 mentioned above, and the computer program includes program instructions. When executing the program instructions, the processor can perform the descriptions of the data processing method in the foregoing embodiment corresponding to FIG. 3. For technical details regarding the non-transitory computer-readable storage medium of this application, reference may be made to the method embodiments of this application.

The non-transitory computer-readable storage medium may be any internal storage unit of the data processing apparatus or the computer device described in any one of the foregoing embodiments, for example, a hard disk or a main memory of the computer device. The non-transitory computer-readable storage medium may also be an external storage device of the computer device, such as a plug-in hard disk, a smart media card (SMC), a secure digital (SD) card, or a flash card that is equipped on the computer device. Further, the non-transitory computer-readable storage medium may also include an internal storage unit of the computer device and an external storage device. The non-transitory computer-readable storage medium is configured to store the computer program and another program and data that used by the computer device. The non-transitory computer-readable storage medium may further be configured to temporarily store data that has been output or data to be output.

Some embodiments provide a computer program product or a computer program, including computer instructions, and the computer instructions being stored in a non-transitory computer-readable storage medium. A processor of a computer device reads the computer instructions from the non-transitory computer-readable storage medium, and the processor executes the computer instructions, to cause the computer device to perform the method according to the embodiments of this application.

In the specification, claims, and accompanying drawings of the embodiments of this application, the terms "first" and "second" are intended to distinguish between different objects but do not indicate a particular order. In addition, the terms "include" and any variant thereof are intended to cover a non-exclusive inclusion. For example, a process, method, apparatus, product, or device that includes a series of steps or units is not limited to the listed steps or modules, and may include additional steps or modules, or may include additional steps or units that are intrinsic to the process, method, apparatus product, or device.

A person skilled in the art may realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The method and related apparatus provided in the embodiments of this application are described with reference to flowcharts and schematic structural diagrams of the method provided in the embodiments of the present disclosure. The computer program instructions may be used to implement each process and each block in the flowcharts and the schematic structural diagrams and a combination of a process and a block in the flowcharts and the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a function in one or more processes in the flowcharts and/or schematic structural diagrams and/or in one or more blocks in the block diagrams. These computer program instructions may alternatively be stored in a computer-readable memory that can instruct a computer or another programmable data processing device to work in a specified manner, so that the instructions stored in the computer-readable memory generate an artifact that includes an instruction apparatus. The instruction apparatus implements a function in one or more procedures in the flowcharts and/or schematic structural diagrams and/or in one or more blocks in the block diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or schematic structural diagrams and/or in one or more blocks in the block diagrams.

What are disclosed above are merely example embodiments of this application, and is not intended to limit the scope of the claims of this application. Therefore, equivalent variations made in accordance with the claims of this application shall fall within the scope of this application.

What is claimed is:

1. A data processing method based on a smart contract comprising:

acquiring a contract call request for executing a transaction service, the contract call request comprising a first asynchronous variable function name and a first variable parameter;

acquiring a first asynchronous variable statement corresponding to the first asynchronous variable function name of a smart contract, the first asynchronous variable statement being a contract statement belonging to a first execution phase of the smart contract, querying during the first execution phase, based on the first asynchronous variable statement, a first memory and a second memory associated with the first variable parameter, the first memory at a location where first to-be-read data is located, and the second memory at a location where second to-be-read data is located;

separately transmitting a data read request to the first memory and the second memory in an asynchronous request manner indicated by the first asynchronous variable statement to obtain the first to-be-read data and the second to-be-read data used for executing the transaction service, a transmitting time stamp for transmitting the data read request to the second memory being earlier than a return time stamp for the first memory to return the first to-be-read data; and acquiring at least two pointer program statements corresponding to the first execution phase when the first to-be-read data and the second to-be-read data are successfully read, the at least two pointer program statements indicating a subsequent execution phase;

determining, based on the first to-be-read data and the second to-be-read data, a target pointer program statement that meets a scheduling condition of the at least two pointer program statements;

scheduling, using the smart contract, a second execution phase indicated by the target pointer program statement, the second execution phase belonging to the subsequent execution phase; and executing, during the second execution phase, the transaction service based on the first to-be-read data and the second to-be-read data.

2. The method according to claim 1, wherein the data read request comprises a first data read request and a second data read request; and the separately transmitting a data read request comprising:

transmitting the first data read request to the first memory at a start time stamp in the asynchronous request manner indicated by the first asynchronous variable statement;

transmitting the second data read request to the second memory during a waiting time period, the waiting time period being a time period comprising the start time stamp and the return time stamp;

receiving the first to-be-read data from the first memory based on the first data read request; and receiving the second to-be-read data returned by the second memory based on the second data read request.

3. The method according to claim 1, wherein each pointer program statement in the at least two pointer program statements is associated with a different scheduling condition, and the determining the target pointer program statement comprising:

acquiring a data relationship between the first to-be-read data and the second to-be-read data;

determining, based on the scheduling condition associated with each pointer program statement, a scheduling condition met by the data relationship;

defining a target scheduling conditions to be the scheduling condition met by the data relationship; and defining the target pointer program statement to be a pointer program statement associated with the target scheduling condition.

4. The method according to claim 1, the executing the transaction service comprising:

acquiring a second asynchronous variable statement corresponding to the second execution phase of the smart contract;

acquiring a target variable parameter expected to be read by the second asynchronous variable statement;

determining target to-be-read data based on the target variable parameter, the first to-be-read data, and the second to-be-read data, the target to-be-read data used for executing the transaction service in the second execution phase; and executing the transaction service in the second execution phase based on the target to-be-read data.

5. The method according to claim 4, the contract call request further comprising a second variable parameter, and the determining the target to-be-read data comprising:

defining the target to-be-read data to be the first to-be-read data and the second to-be-read data when both the target variable parameter comprises the first variable parameter and the target variable parameter does not comprise the second variable parameter.

6. The method according to claim 4, the contract call request further comprising a second variable parameter, and the determining the target to-be-read data comprising:

querying, based on the second asynchronous variable statement, a target memory associated with the second variable parameter when both the target variable parameter comprises the first variable parameter and the target variable parameter comprises the second variable parameter; and determining the target to-be-read data based on the target memory, the first to-be-read data, and the second to-be-read data.

7. The method according to claim 6, the determining the target to-be-read data comprising:

transmitting a target data read request to the target memory in an asynchronous request manner indicated by the second asynchronous variable statement;

receiving third to-be-read data from the target memory based on the target data read request; and defining the third to-be-read data to be the first to-be-read data and the second to-be-read data.

8. The method according to claim 4, the executing the transaction service comprising:

acquiring a service logic statement corresponding to the second execution phase; and performing a logical operation on the target to-be-read data based on a data processing logic indicated by the service logic statement to obtain a transaction execution result corresponding to the transaction service.

9. The method according to claim 8, the method further comprising:

generating, based on the transaction execution result, a block to be added to a blockchain, the smart contract belonging to the blockchain;

broadcasting the block to a consensus node on the blockchain; and adding the block to the blockchain when the consensus node passes consensus on the block.

10. The method according to claim 1, the method further comprising:

acquiring a contract deployment request transmitted by a user terminal, the contract deployment request comprising the first asynchronous variable function name, a second asynchronous variable function name, the first asynchronous variable statement, and a second asynchronous variable statement corresponding to the second asynchronous variable function name; and creating a smart contract based on a mapping relationship between the first asynchronous variable function name and the first execution phase and a mapping relationship between the second asynchronous variable function name and the second execution phase, the smart contract comprising the first asynchronous variable function name, the second asynchronous variable function name, the first asynchronous variable statement, and the second asynchronous variable statement, both the first execution phase and the second execution phase being execution phases corresponding to the transaction service.

11. The method according to claim 10, the contract deployment request further comprising a pointer program statement, and the method further comprising:

acquiring, based on the contract deployment request, a pointer program statement corresponding to the first execution phase and a pointer program statement corresponding to the second execution phase; and deploying the pointer program statement corresponding to the first execution phase and the pointer program statement corresponding to the second execution phase into the smart contract.

12. An electronic device comprising at least one processor and at least one memory, the at least one memory storing computer-readable instructions, the computer-readable instructions, when executed by the at least one processor, causing the at least one processor to:

acquire a contract call request for executing a transaction service, the contract call request comprising a first asynchronous variable function name and a first variable parameter;

acquire a first asynchronous variable statement corresponding to the first asynchronous variable function name of a smart contract, the first asynchronous variable statement being a contract statement belonging to a first execution phase of the smart contract;

query during the first execution phase, based on the first asynchronous variable statement, a first memory and a second memory associated with the first variable parameter, the first memory at a location where first to-be-read data is located, and the second memory at a location where second to-be-read data is located;

separately transmit a data read request to the first memory and the second memory in an asynchronous request manner indicated by the first asynchronous variable statement, to obtain the first to-be-read data and the second to-be-read data used for executing the transaction service, a transmitting time stamp for transmitting the data read request to the second memory being earlier than a return time stamp for the first memory to return the first to-be-read data; and acquire at least two pointer program statements corresponding to the first execution phase when the first to-be-read data and the second to-be-read data are successfully read, the at least two pointer program statements indicating a subsequent execution phase;

determine, based on the first to-be-read data and the second to-be-read data, a target pointer program statement that meets a scheduling condition of the at least two pointer program statements;

schedule, using the smart contract, a second execution phase indicated by the target pointer program statement, the second execution phase belonging to the subsequent execution phase; and execute, during the second execution phase, the transaction service based on the first to-be-read data and the second to-be-read data.

13. The electronic device according to claim 12, wherein the data read request comprises a first data read request and a second data read request; and wherein the electronic device is further configured to:

transmit the first data read request to the first memory at a start time stamp in the asynchronous request manner indicated by the first asynchronous variable statement;

transmit the second data read request to the second memory during a waiting time period, the waiting time period being a time period comprising the start time stamp and the return time stamp;

receive the first to-be-read data from the first memory based on the first data read request; and receive the second to-be-read data from the second memory based on the second data read request.

14. The electronic device according to claim 12, further configured to:

acquire a contract deployment request transmitted by a user terminal, the contract deployment request comprising the first asynchronous variable function name, a second asynchronous variable function name, the first asynchronous variable statement, and a second asynchronous variable statement corresponding to the second asynchronous variable function name; and create a smart contract based on a mapping relationship between the first asynchronous variable function name and the first execution phase and a mapping relationship between the second asynchronous variable function name and the second execution phase, the smart contract comprising the first asynchronous variable function name, the second asynchronous variable function name, the first asynchronous variable statement, and the second asynchronous variable statement, both the first execution phase and the second execution phase being execution phases corresponding to the transaction service.

15. The electronic device according to claim 14, wherein the contract deployment request further comprises a pointer program statement, and wherein the electronic device is further configured to:

acquire, based on the contract deployment request, a pointer program statement corresponding to the first execution phase and a pointer program statement corresponding to the second execution phase; and deploy the pointer program statement corresponding to the first execution phase and the pointer program statement corresponding to the second execution phase into the smart contract.

16. The electronic device according to claim 12, wherein each pointer program statement in the at least two pointer program statements is associated with a different scheduling condition, and wherein the determine the target pointer program statement comprises:

acquire a data relationship between the first to-be-read data and the second to-be-read data;

determine, based on the scheduling condition associated with each pointer program statement, a scheduling condition met by the data relationship;

define a target scheduling conditions to be the scheduling condition met by the data relationship; and define the target pointer program statement to be a pointer program statement associated with the target scheduling condition.

17. The electronic device according to claim 12, wherein the execute the transaction service comprises:

acquire a second asynchronous variable statement corresponding to the second execution phase of the smart contract;

acquire a target variable parameter expected to be read by the second asynchronous variable statement;

determine target to-be-read data based on the target variable parameter, the first to-be-read data, and the second to-be-read data, the target to-be-read data used for executing the transaction service in the second execution phase; and execute the transaction service in the second execution phase based on the target to-be-read data.

18. The electronic device according to claim 17, wherein the contract call request further comprises a second variable parameter, and the determining the target to-be-read data comprises:

define the target to-be-read data to be the first to-be-read data and the second to-be-read data when both the target variable parameter comprises the first variable parameter and the target variable parameter does not comprise the second variable parameter.

19. A non-transitory computer-readable storage medium storing at least one instruction, at least one program, a code set, or an instruction set, the at least one instruction, the at least one program, the code set, or the instruction set being loaded and executed by at least one processor, causing the at least one processor to perform a data processing method comprising:

acquiring a contract call request for executing a transaction service, the contract call request comprising a first asynchronous variable function name and a first variable parameter;

acquiring a first asynchronous variable statement corresponding to the first asynchronous variable function name of a smart contract, the first asynchronous variable statement being a contract statement belonging to a first execution phase of the smart contract, querying during the first execution phase, based on the first asynchronous variable statement, a first memory and a second memory associated with the first variable parameter, the first memory at a location where first to-be-read data is located, and the second memory at a location where second to-be-read data is located;

separately transmitting a data read request to the first memory and the second memory in an asynchronous request manner indicated by the first asynchronous variable statement to obtain the first to-be-read data and the second to-be-read data used for executing the transaction service, a transmitting time stamp for transmitting the data read request to the second memory being earlier than a return time stamp for the first memory to return the first to-be-read data; and acquiring at least two pointer program statements corresponding to the first execution phase when the first to-be-read data and the second to-be-read data are successfully read, the at least two pointer program statements indicating a subsequent execution phase;

determining, based on the first to-be-read data and the second to-be-read data, a target pointer program statement that meets a scheduling condition of the at least two pointer program statements;

scheduling, using the smart contract, a second execution phase indicated by the target pointer program statement, the second execution phase belonging to the subsequent execution phase; and executing, during the second execution phase, the transaction service based on the first to-be-read data and the second to-be-read data.

20. The non-transitory computer-readable storage medium of claim 19, wherein each pointer program statement in the at least two pointer program statements is associated with a different scheduling condition, the determining the target pointer program statement comprising:

acquiring a data relationship between the first to-be-read data and the second to-be-read data;

determining, based on the scheduling condition associated with each pointer program statement, a scheduling condition met by the data relationship;

defining a target scheduling conditions to be the scheduling condition met by the data relationship; and defining the target pointer program statement to be a pointer program statement associated with the target scheduling condition.

* * * * *